W. WILMINGTON'S

IMPROVED CAR-WHEEL-CHILL.

No. 4,102.

Reissued AUG. 16, 1870.
2 Sheets, Sheet 1.

itnesses,
ney E. Smith
M Campbell

Inventor,
William Wilmington
By his attorney
Z. C. Robbins

W. WILMINGTON'S

IMPROVED CAR-WHEEL-CHILL.

NO. 4,102.

Reissued. Aug. 16, 1870.
2 Sheets, Sheet 2.

Witnesses,
Sydney E. Smith.
L. M. Campbell

Inventor,
William Wilmington.
By his attorney
Z. C. Robbins

UNITED STATES PATENT OFFICE.

WILLIAM WILMINGTON, OF TOLEDO, OHIO.

IMPROVEMENT IN CHILLS FOR CASTING CAR-WHEELS.

*Specification forming part of Letters Patent No.* 85,046, *dated December* 15, 1868; *reissue No.* 4,102, *dated August* 16, 1870.

*To all whom it may concern:*

Be it known that I, WILLIAM WILMINGTON, of Toledo, in the county of Lucas and State of Ohio, have invented a new and useful Improvement in the Annular Metallic Portion or Chill which Forms the Periphery of a Car-Wheel Mold; and I do hereby declare that the following is a full and exact description thereof, reference being had to the accompanying drawings, which form a portion of this specification.

Figure 2:
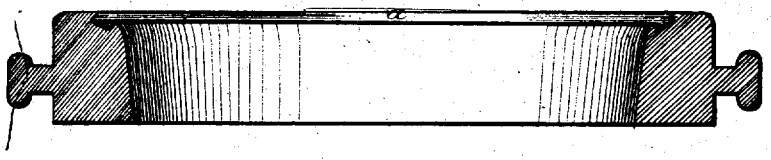
Figure 1:
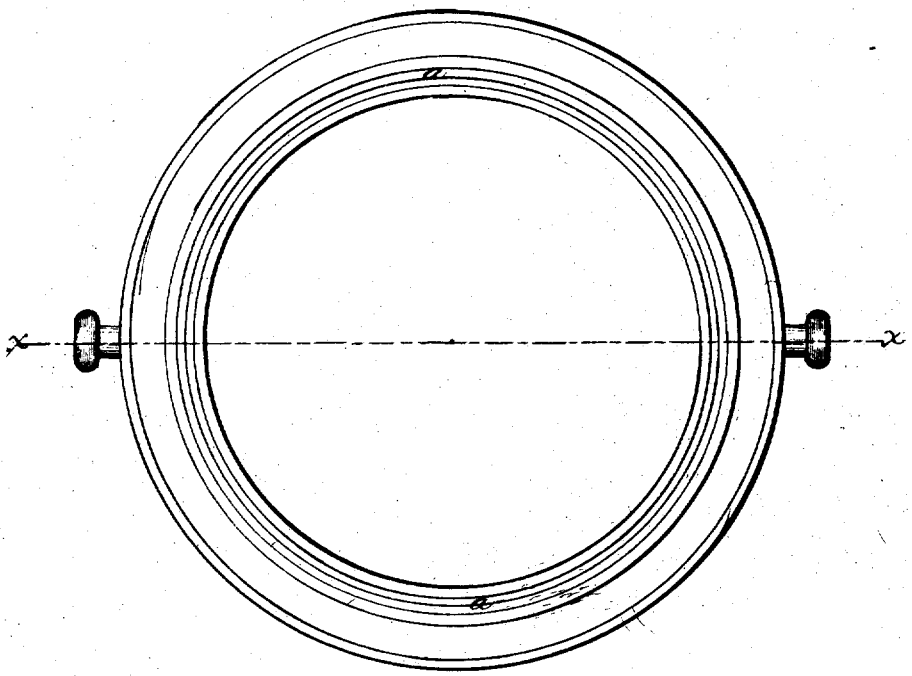
Figure 3:
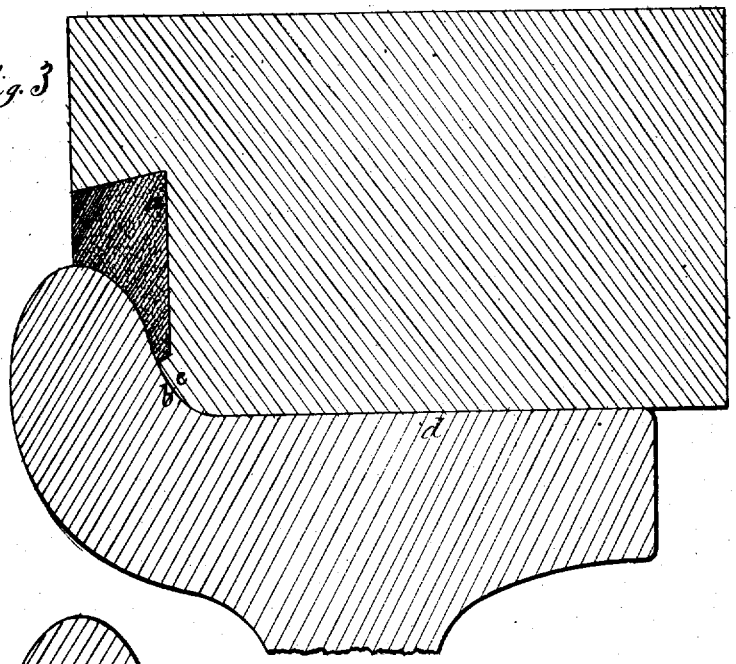
Figure 4:
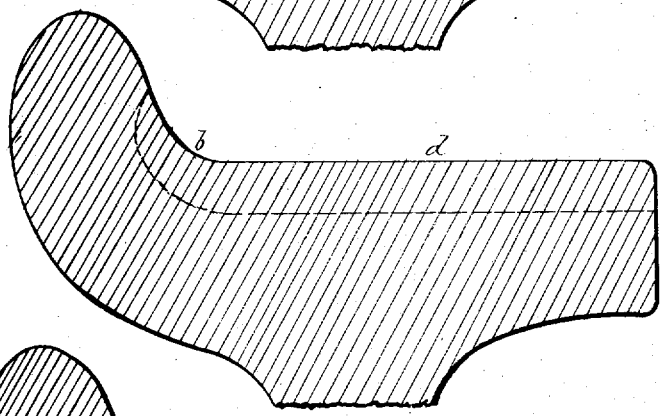

Figure 1 is a top view of my improved car-wheel chill; Fig. 2, a transverse section of the same in the line *x x* of Fig. 1; Fig. 3, a full-sized sectional representation of said improved car-wheel chill, and also of the rim portion of a car-wheel in close contact therewith; Fig. 4, a full-sized section of the rim portion of one of my improved car-wheels, or a wheel that has been cast in a mold supplied with my improved chill; and Fig. 5 is a section of the rim portion of a car-wheel that has been cast in the ordinary car-wheel mold.

In the molding for and the casting of car-wheels by the methods heretofore in universal use the simultaneous chilling of the tread of a car-wheel with the entire inner surface of the flange thereof has produced the following bad effects, viz: First, the chilling of the periphery portion of the flange of a car-wheel causes radial fractures therein, which in many cases utterly unfits the wheel for practical use. Second, the chilling of the periphery and the entire inner surface of the flange of a car-wheel simultaneously with the tread of the same causes a very thin depth of chill at the junction-curve *b*, between the inner surface of the flange and the tread *d* of a car-wheel, as shown by the dotted lines in Fig. 5—the very portion of a car-wheel upon which the rails exert the greatest amount of abrading action, and the portion of all car-wheels which first shows a weakness that requires the condemnation of said wheels.

The aforesaid defects in car-wheels I have completely remedied by forming a groove, *a*, in the annular chill of the car-wheel mold, just outside of the curve *c* of said chill, between its inner periphery and the outer right-angular face thereof, and then filling said groove with sand, or some other non-chilling material, as shown in Fig. 3.

Figure 5:
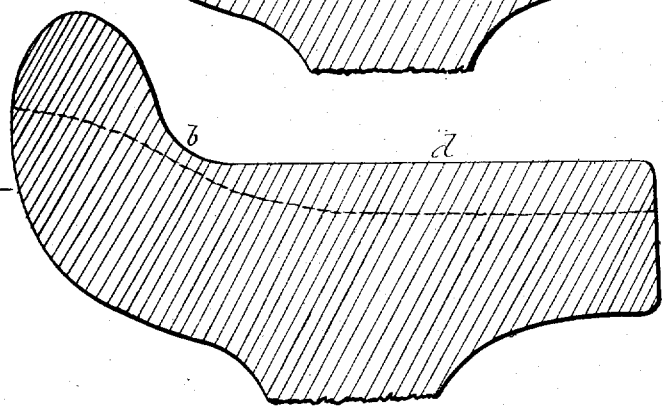

When this improved chill forms a portion of a car-wheel mold the influence of the chill upon the inner face of flange of the car-wheel cast therein will be confined to the curve *b* thereof, just outside of the tread *d* of the wheel, and the depth of the chill at that point will be nearly or quite the same as that of the tread *d* of the wheel, substantially as represented by the dotted lines in Fig. 5; while the entire remaining portion of said flange, being cast in the sand portion of the mold, is in all cases found smooth and free from fractures. Consequently, in the manufacture of my improved car-wheels in molds that are supplied with my improved car-wheel chills I avoid the great loss which others suffer from the cracking of the flanges of their car-wheels, while the durability of my said improved car-wheels is fully twenty-five per cent. greater than that of the car-wheels cast in any other known description of car-wheel molds.

What I claim as my invention, and desire to secure by Letters Patent, is—

The improvement in the annular metallic portion or chill of a car-wheel mold, produced therein by the annular groove *a*, for the reception of core-sand, or its equivalent, substantially as and for the purpose herein set forth.

Witnesses: WM. WILMINGTON.

Z. C. ROBBINS,

SYDNEY E. SMITH.